Dec. 9, 1952  C. NITARDY  2,621,285
LIGHTING FIXTURE FOR ELONGATED TUBULAR LAMPS
Filed Dec. 31, 1948  2 SHEETS—SHEET 1

INVENTOR.
Carl Nitardy
BY Lawrence Burns
ATTORNEY

INVENTOR.
Carl Nitardy
BY Lawrence Burns
ATTORNEY

Patented Dec. 9, 1952

2,621,285

UNITED STATES PATENT OFFICE 2,621,285

LIGHTING FIXTURE FOR ELONGATED TUBULAR LAMPS

Carl Nitardy, Ipswich, Mass., assignor to Sylvania Electric Products Inc., Salem, Mass., a corporation of Massachusetts Application December 31, 1948, Serial No. 68,625

1 Claim. (Cl. 240—51.11)

This invention relates to lighting fixtures and particularly to fixtures using tubular lamps.

The invention increases the usefulness and adaptability of fixtures having discharge lamps for a light source. The fixture is composed of a chassis so constructed of metal that it presents a maximum of durability and minimum of weight. A feature of the invention is embodied in a light control unit which is detachably mounted upon the chassis and is adapted to control the laterally and downwardly radiated light from the lamps.

The light control member is constructed of metal and has a pair of end members extending over the ends of the chassis. The end members are connected by side members rigidly secured thereto. The side members are inherently rigid and are so organized that they serve to control the light laterally radiated by cutting off all direct radiation to the outside of the fixture while some of the light is used to indirectly illuminate the side areas of the fixture. The special structure above indicated provides an inherently rigid skeleton frame to embrace the fixture and provide an entirely open bottom area within which may be secured a louver or diffuser panel of glass or plastic.

A more detailed description of the manner in which the principles of the invention are applied in practice will follow.

It is an object of the invention to provide a fixture having maximum strength and rigidity.

A further object of the invention is to provide a fixture which is mechanically and electrically efficient.

A further object of the invention is to provide a fixture which is readily cleaned and kept at its highest operating efficiency.

A further object of the invention is to provide a fixture in which the light therefrom is controlled downward by and laterally in such a manner that a maximum amount of these areas either radiates light directly in a controlled manner or is indirectly lighted thereby to provide a lighting unit having a minimum of blacked out areas.

Other objects and features of the invention will more fully appear from the following description and will be particularly pointed out in the claim.

To provide a better understanding of the invention a particular embodiment thereof will be described and is illustrated in the accompanying drawings in which Fig. 1 is a perspective view of a fixture embodying the invention.

Figure 1:
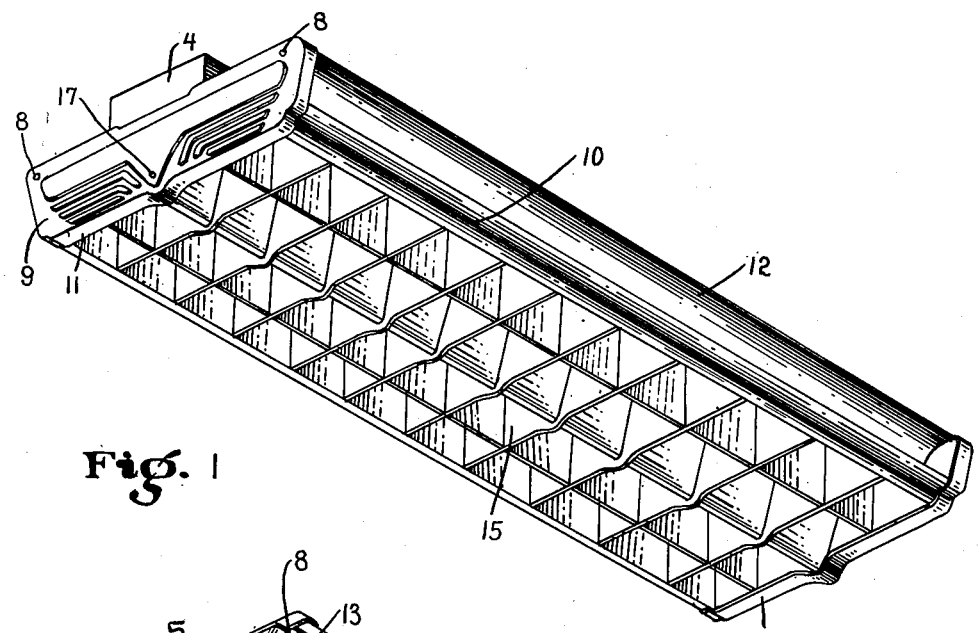
Figure 2:
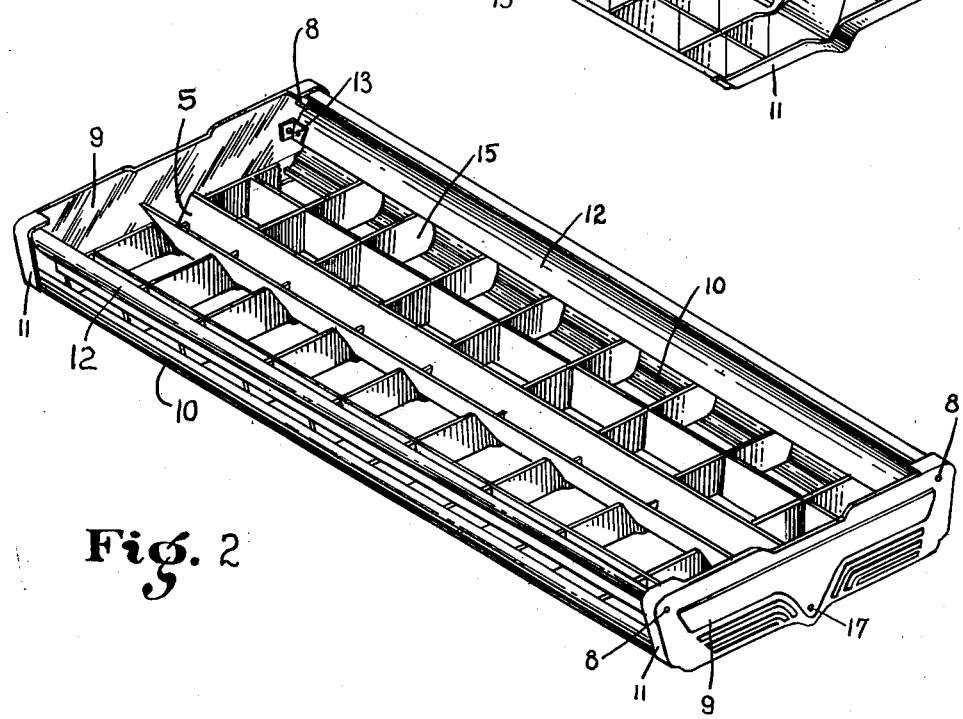
Fig. 2 is a perspective view of the light controlling member of the fixture detached therefrom.

The invention is shown herein in connection with a fluorescent type lighting unit using straight tubular fluorescent lamps 1 which are received in lamp holders 2 secured upon the ends of a chassis 3 which may be constructed in any suitable manner. As shown the chassis is composed of a channel shaped elongated housing 4, within which are mounted suitable wiring means and auxiliary devices for operating the lamps.

The bottom of the housing is closed by a suitable reflector 5, desirably V-shaped in cross section extending lengthwise of the chassis between the lamps. Two or four lamps may be used. A four lamp fixture is shown herein in which case the reflector is located between the two middle lamps.

The ends of the chassis have secured thereto laterally extending end plates 6 upon which the lampholder 2 are mounted. The outer ends of the plates 6 are provided with upwardly opening notches 7 within which are received the pins 8 which are rigidly secured upon the inner faces of end members 9 of a light controlling basket like member which is detachably hung upon the chassis by placing the pins 8 in the notches 7. The light control member is thus held in position to control the light radiated downward and laterally from the lamps.

The light control member when separated from the fixture should have considerable inherent rigidity to protect it from damage in handling and shipping. Such devices have heretofore been mechanically weak and subject to much damage when detached from the fixture.

The design of such devices to overcome the deficiencies therein heretofore existing has required the solving of several problems. For example it is of major importance to maintain substantially the total area of the bottom of the light control member free of opaque members. The sides of this member must therefore provide the necessary strength to stiffen the whole unit. In the present invention two metal members extend between the end members 9 at each side of the fixture. The lower members 10 are welded or otherwise rigidly secured at each end to the end members 9. Any suitable method of welding may be used. As shown herein the end members 9 have an inwardly turned peripheral flange 11 to which the ends of the members 10 are spot or otherwise welded.

Figure 3:
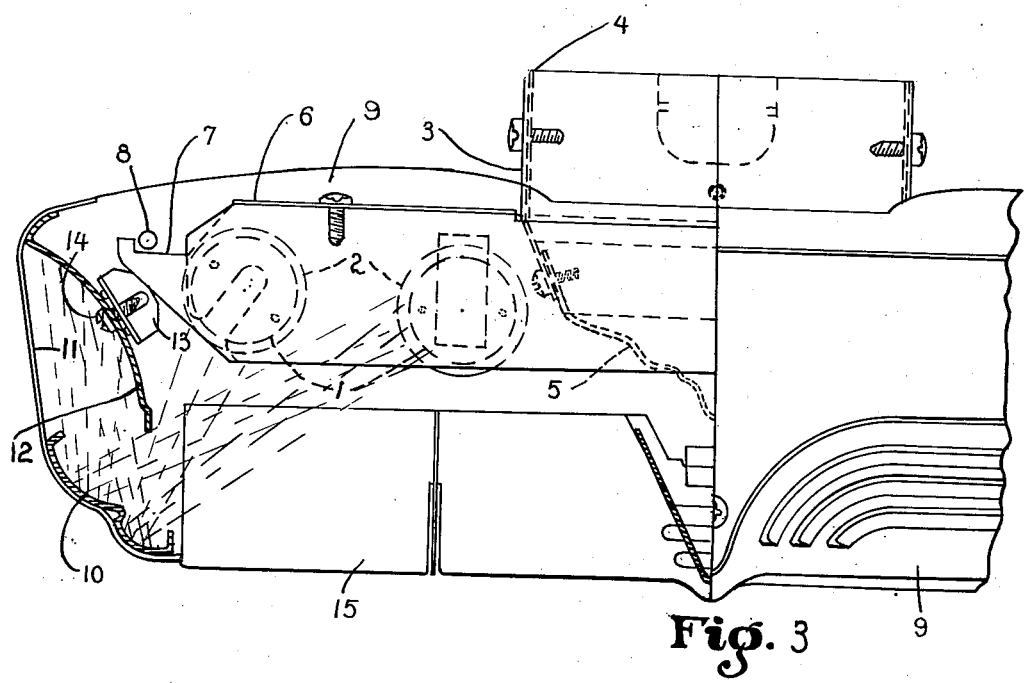
Fig. 3 is a partial cross section of the fixture.
Figure 4:
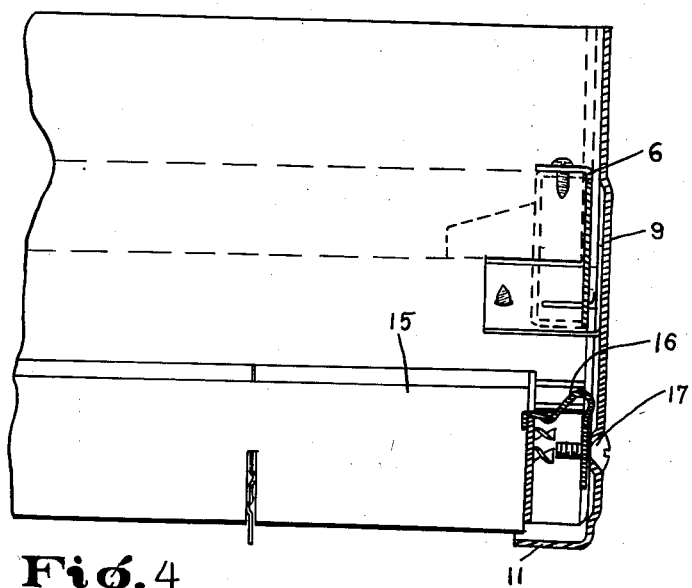
Fig. 4 is a longitudinal section of the end portion of the fixture.

The members 10 desirably are given an ornamental contour and desirably their edges are bent inwardly to produce a finished appearance and to stiffen and strengthen them. The cross-sectional shape of the members 10 and the character of their inner surface should also be such as to constitute a reflecting surface. The upper members 12 at the sides of the light control member are of substantial width and desirably concaved outwardly and are so disposed with respect to the members 10 that no direct light from the lamps is permitted to escape from the sides of the fixture. The members 10 and 12 are so disposed relatively to each other that the inner surface of the members 10 act to reflect the light from one or more of the lamps 1 upward where it strikes the outer surface of the members 12 and is reflected outward and downward as shown by the dotted lines in Fig. 3. The upwardly reflected rays pass between the upper edge of the members 12.

The members 12 extend the full length of the control member and are secured to the end members 10 in any suitable manner. For example they may be secured in the same manner as the members 10 or they may be fastened by screws or bolts or by a combination of screws and welding. As shown the members 12 are secured in place by means of one or more brackets 13 welded or otherwise secured to the end plates and presenting supporting arms to which the members 12 are secured by the screws 14. It will be observed that by rigidly securing the members 10 and 12 to the end members an inherently rigid structure is formed. Due to the cross sectional formation of and their relatively large width dimension the members 12 act as rigid beams or struts to tie the control member together in a durable unit capable of being handled and shipped without damage when detached from the fixture. It will be understood that any suitable number and arrangement of side members or louvers may be used to create the effect described above.

The fixture may be mounted in any suitable manner. For example it may be installed as a canopy fixture in which case the light from the lamps is permitted to radiate upward and supply indirect light for the surrounding area. Downwardly directed light from the fixture is desirably controlled to prevent excessive glare from the lamps reaching the illuminated area. As shown a louver 15 is provided to control the light. If preferred a diffusing panel may be substituted for the louver. The louver shown is secured in the lower opening of the control unit in any desired manner. As shown the louver is held in place by a clip 16 secured to the end members by means of screws 17.

In the embodiment of the invention described means are provided to readily attach or remove the control unit thereby to provide access to the lamps and reflecting surfaces for cleaning and servicing. To accomplish this the slots 7 are elongated to provide space inwardly of the pins 8 when the control unit is in operating position. To remove the unit one side thereof is lifted and pulled forward until the pins 8 will swing freely over the ends of the end plates 6. The whole control unit then will swing down and may be left to hang on its other two pins 8 or entirely removed.

What I claim is:

A lighting fixture comprising: a chassis; end plates attached to the ends of said chassis; lampholders mounted on said end plates; elongated tubular lamps supported by said lampholders; and a substantially rectangular light-controlling member mounted on said end plates and enclosing said lamps, said light-controlling member having end members and side members, each side member consisting of a pair of curved panels, each of which has an inner and outer face, one of said panels being disposed adjacent to one of said lamps and lying in substantially the same horizontal plane therewith, and the other of said panels being disposed beneath and in register with said first mentioned panel, the outer face of the first mentioned panel and the inner face of the second mentioned panel having a substantially concave reflecting surface, and the lower longitudinal edge of the upper panel lying in substantially the same horizontal plane as the plane in which the upper longitudinal edge of the lower panel lies.

CARL NITARDY.

REFERENCES CITED

The following references are of record in the file of this patent:

UNITED STATES PATENTS

| Number | Name | Date |
| --- | --- | --- |
| 2,139,005 | Doane | Dec. 6, 1938 |
| 2,305,722 | Livers | Dec. 22, 1942 |
| 2,312,619 | Beck | Mar. 2, 1943 |
| 2,365,614 | Winkler et al. | Dec. 19, 1944 |
| 2,427,084 | Alderman | Sept. 9, 1947 |
| 2,431,656 | Barker | Nov. 25, 1947 |
| 2,436,635 | De Bishop, Jr. | Feb. 24, 1948 |